US010800277B2

(12) United States Patent
Hatami et al.

(10) Patent No.: US 10,800,277 B2
(45) Date of Patent: Oct. 13, 2020

(54) VEHICLE BODY FRONT STRUCTURE

(71) Applicant: HONDA MOTOR CO., LTD., Minato-ku, Tokyo (JP)

(72) Inventors: Makoto Hatami, Wako (JP); Yukinobu Nakanishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/553,563

(22) Filed: Aug. 28, 2019

(65) Prior Publication Data

US 2020/0101852 A1 Apr. 2, 2020

(30) Foreign Application Priority Data

Sep. 27, 2018 (JP) .................................. 2018-181341

(51) Int. Cl.
| | |
|---|---|
| *B60L 53/16* | (2019.01) |
| *H01R 13/516* | (2006.01) |
| *H01R 107/00* | (2006.01) |
| *B62D 21/15* | (2006.01) |

(52) U.S. Cl.
CPC ............ *B60L 53/16* (2019.02); *H01R 13/516* (2013.01); *B62D 21/152* (2013.01); *H01R 2107/00* (2013.01); *H01R 2201/26* (2013.01)

(58) Field of Classification Search
CPC ... B60L 53/16; H01R 13/516; H01R 2201/26; H01R 2107/00; B62D 21/152; B62D 25/12; B62D 25/24
USPC ........................................................ 296/97.22
See application file for complete search history.

(56) References Cited

U.S. PATENT DOCUMENTS

2012/0049799 A1 3/2012 Terashima et al.
2018/0229771 A1* 8/2018 Sekine ..................... B60K 1/04

FOREIGN PATENT DOCUMENTS

JP 2011020601 A 2/2011

\* cited by examiner

*Primary Examiner* — Pinel E Romain
(74) *Attorney, Agent, or Firm* — Armstrong Teasdale LLP

(57) ABSTRACT

A vehicle body front structure provided with a charging port device to which a charging connector is selectively connected is provided. The vehicle body front structure includes: a pair of longitudinal members extending in a fore and aft direction on either side of a vehicle body; a bulkhead including an upper member extending laterally and having lateral ends connected to the respective longitudinal members; a lateral member extending laterally behind the bulkhead, and having lateral ends connected to the respective longitudinal members; and a support member having a front part fixed to the upper member and a rear part fixed to the lateral member to support the charging port device.

9 Claims, 8 Drawing Sheets

VEHICLE BODY FRONT STRUCTURE

TECHNICAL FIELD

The present invention relates to a vehicle body front structure, and more particularly to a vehicle body front structure for vehicles having a charging port device, such as electric vehicles.

BACKGROUND ART

Electric vehicles are typically fitted with a charging port device in a front end part of a vehicle body to allow a charging connector to be selectively connected thereto for the purpose of charging an onboard battery by electric power supplied by an external power source. In a known electric vehicle, a vehicle body thereof includes a pair of front side members extending in the fore and aft direction along either side of the vehicle body, and an upper cross member laterally extending between the front end parts of the front side members, and a charging port device is attached to a support member that extends forward from the upper cross member. See JP2011-20601A.

According to this previously proposed vehicle body front structure, since the support member extends from the upper cross member, and hangs over the front part of the vehicle body. This causes the overall overhang of the front bumper beam as measured from the front wheels to be extended, and prevents a compact design of the electric vehicle.

SUMMARY OF THE INVENTION

In view of such a problem of the prior art, a primary object of the present invention is to provide a vehicle body front structure provided with a charging port device that is mounted in a front part of the vehicle body so as to minimize the front overhang length.

To achieve such an object, the present invention provides a vehicle body front structure provided with a charging port device (70) to which a charging connector is selectively connected, the vehicle body front structure comprising: a pair of longitudinal members (22) extending in a fore and aft direction on either side of a vehicle body; a bulkhead (26) including an upper member (24) extending laterally and having lateral ends connected to the respective longitudinal members (22); a lateral member extending laterally behind the bulkhead; and having lateral ends connected to the respective longitudinal members (22), and a support member (50) having a front part fixed to the upper member and a rear part fixed to the lateral member to support the charging port device (70).

Thereby, the charging port device (70) can be securely mounted without increasing the front overhang.

Preferably, the support member (50) has a mounting plate (56) to which the charging port device (70) is attached, the support member being fixed to the lateral member at a fixing point (68) which is located in a region (A) overlapping with a projection plane of a mounting surface of the mounting plate projected in a direction (X) for connecting and disconnecting the charging connector to and from the charging port device.

Thereby, when the charging connector is connected and disconnected to and from the charging port device, the bending moment acting on the support member is minimized, and the mounting strength of the support member can be maximized.

Preferably, the support member (50) includes a bent piece (58) provided on a peripheral edge of the mounting plate (56).

Thereby, the bending stiffness of the support member (50) is improved, and the mounting strength of the charging port device (70) on the mounting plate (56) is improved.

Preferably, the support member (50) includes a front mounting piece (62) extending forward from the mounting plate (56), the front mounting piece defining a laterally extending bend (60) at a boundary between the mounting plate and the front mounting piece, the front mounting piece (62) being fixed to the upper member (24) at a fixing point (66).

When an excessive impact load is applied to the support member (50) from above, a main part of the support member bends downward about the bend, and this deformation absorbs the energy of the impact load.

Preferably, the charging port device (70) includes a main body (72) connected to an internal cable (82), and the support member is provided with an opening (53) receiving the main body therein.

A part of the charging port device can be received in the opening, and the internal cable can be extended into the vehicle body via the opening in a convenient manner.

Preferably, the support member (50) includes a frangible part (B) which is reduced in mechanical strength relative to a surrounding part.

Thereby, an impact load acting on the support member can be favorably absorbed.

Preferably, the lateral member (28) comprises a mount base (33) including a rectangular frame member (30) having three or four sides in plan view, and a pair of connecting members (32) connecting respective lateral ends of the frame member to the adjoining longitudinal members (22).

Owing to the high stiffness of the mount base, the support strength of the support member (50) is improved.

Preferably, an electric unit (38) associated with the charging port device is attached to the mount base.

Thereby, even when the electric unit is heavy in weight, the mount base can support the electric unit in a stable manner, and can protect the electric unit from vibrations that could affect the NV characteristics of the electric unit.

Preferably, the vehicle body front structure further comprises a lid support member (102) attached to the support member via a pair of attachment pieces (90) and surrounding the charging port device (70), and a lid member (100) hinged to the lid support member for selectively exposing the charging port device, wherein each attachment piece (90) includes a bend therein so as to be L-shaped in front view.

When an excessive impact load is applied to the lid member from above, the energy of the impact load can be absorbed by the attachment pieces undergoing bending deformation. The bend in each attachment piece allows the bending deformation to be performed in a predictable manner.

Thus, the present invention provides a vehicle body front structure provided with a charging port device that is mounted in a front part of the vehicle body so as to minimize the front overhang length. Further, the charging port device can be mounted to a front end part of the vehicle body with a high mounting stiffness.

BRIEF DESCRIPTION OF THE DRAWING(S)

DESCRIPTION OF THE PREFERRED EMBODIMENT(S)

A vehicle body front structure according to an embodiment of the present invention is described in the following with reference to FIGS. 1 to 7.

Figure 1:
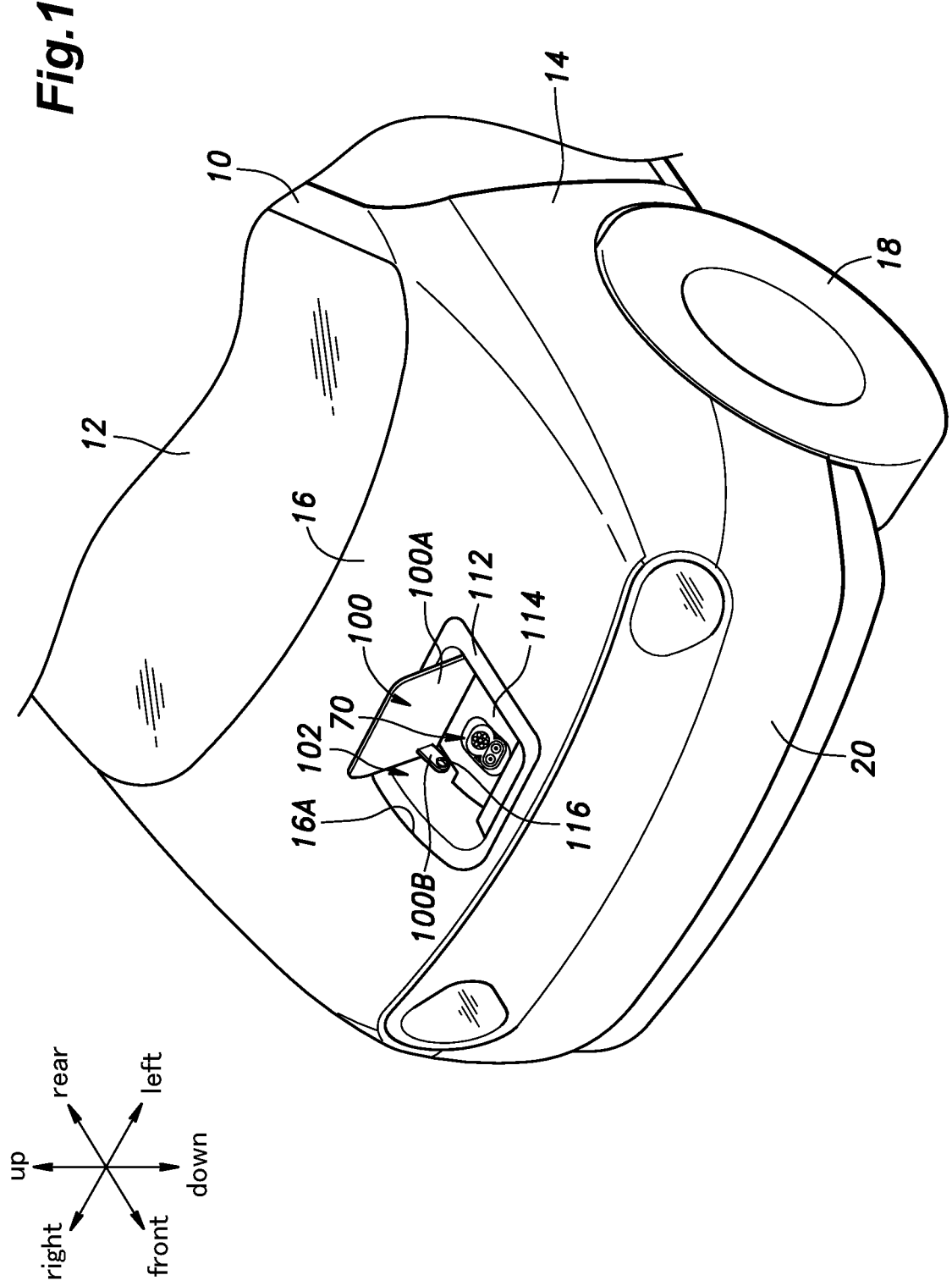
FIG. 1 is a perspective view of a front part of an electric vehicle to which a vehicle body front structure according to an embodiment of the present invention is applied.

As shown in FIG. 1, an electric vehicle to which the vehicle body front structure according to the present embodiment is applied generally includes a pair of front pillars 10, the front windshield 12 extending between the front pillars 10, a pair of front fender panels 14 defining a front space therebetween, a front hood panel 16 which is hinged to the vehicle body so as to open and close the front space, a pair of front wheels 18, and a front bumper 20. The front hood panel 16 is provided with a charging port opening 16A consisting of a rectangular opening located centrally in a front end part of the front hood panel 16.

Figure 2:
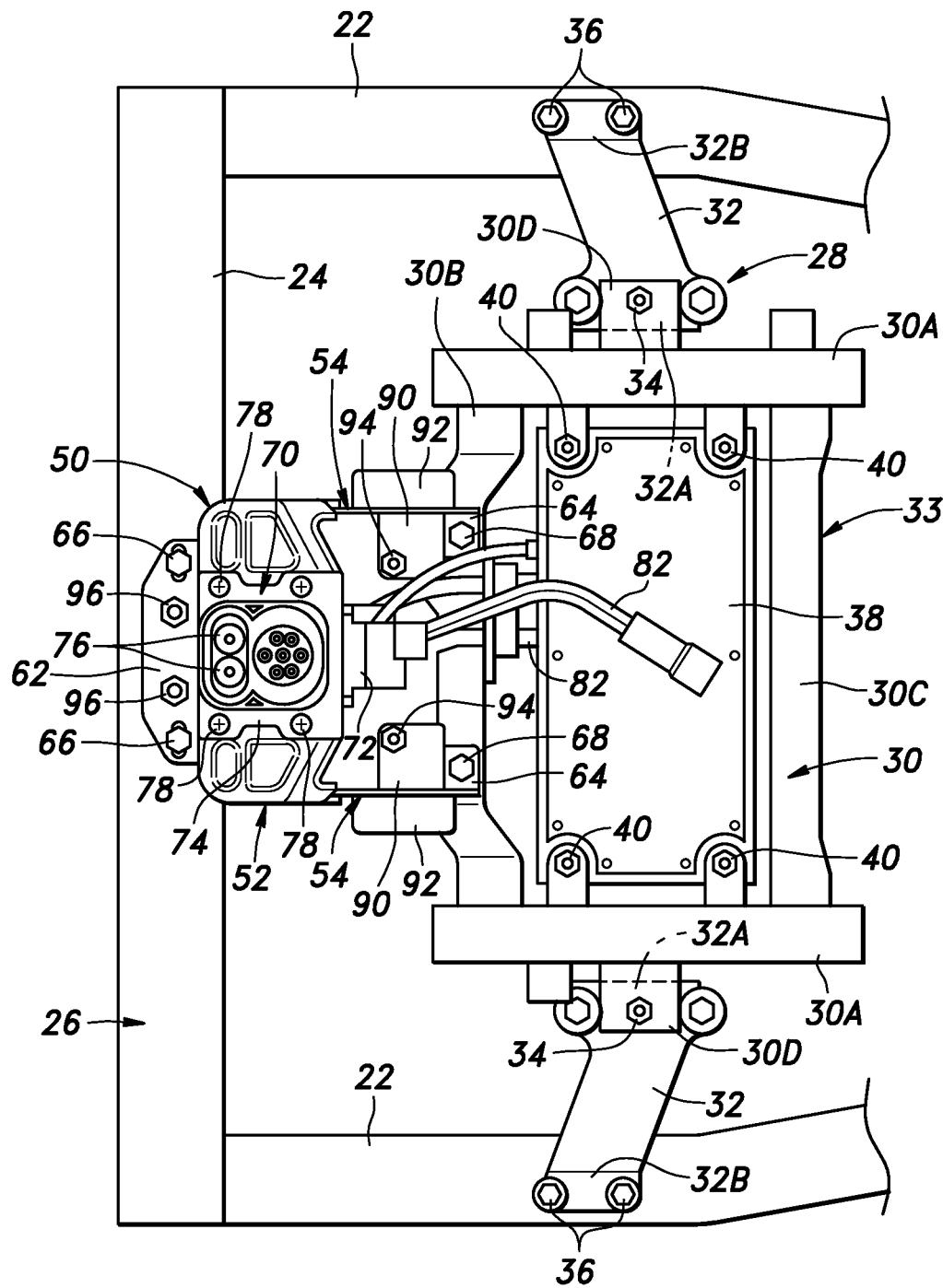
FIG. 2 is a plan view of the vehicle body front structure according to the embodiment.
Figure 3:
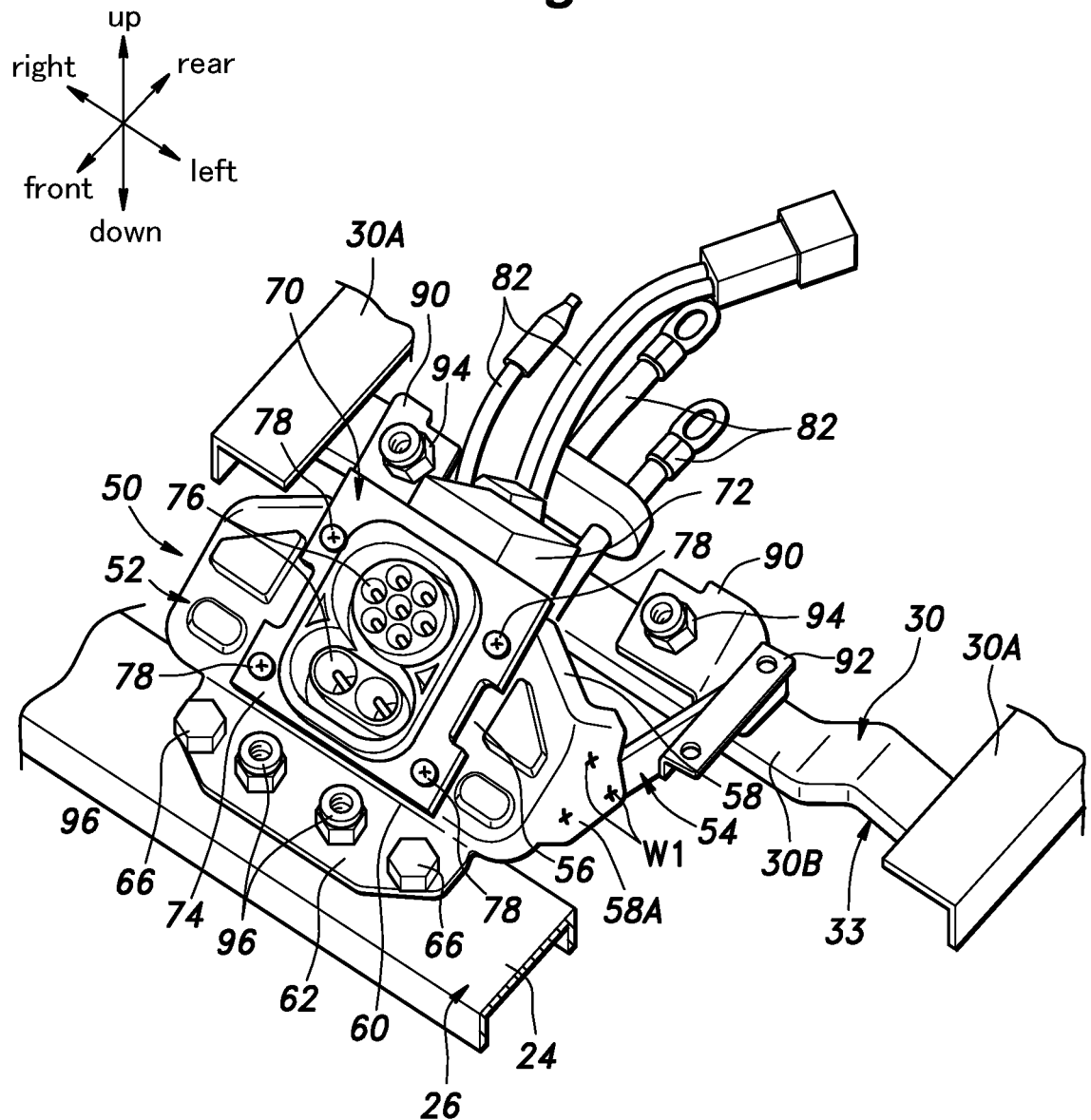
FIG. 3 is a perspective view of a main part of the vehicle body front structure.
Figure 4:
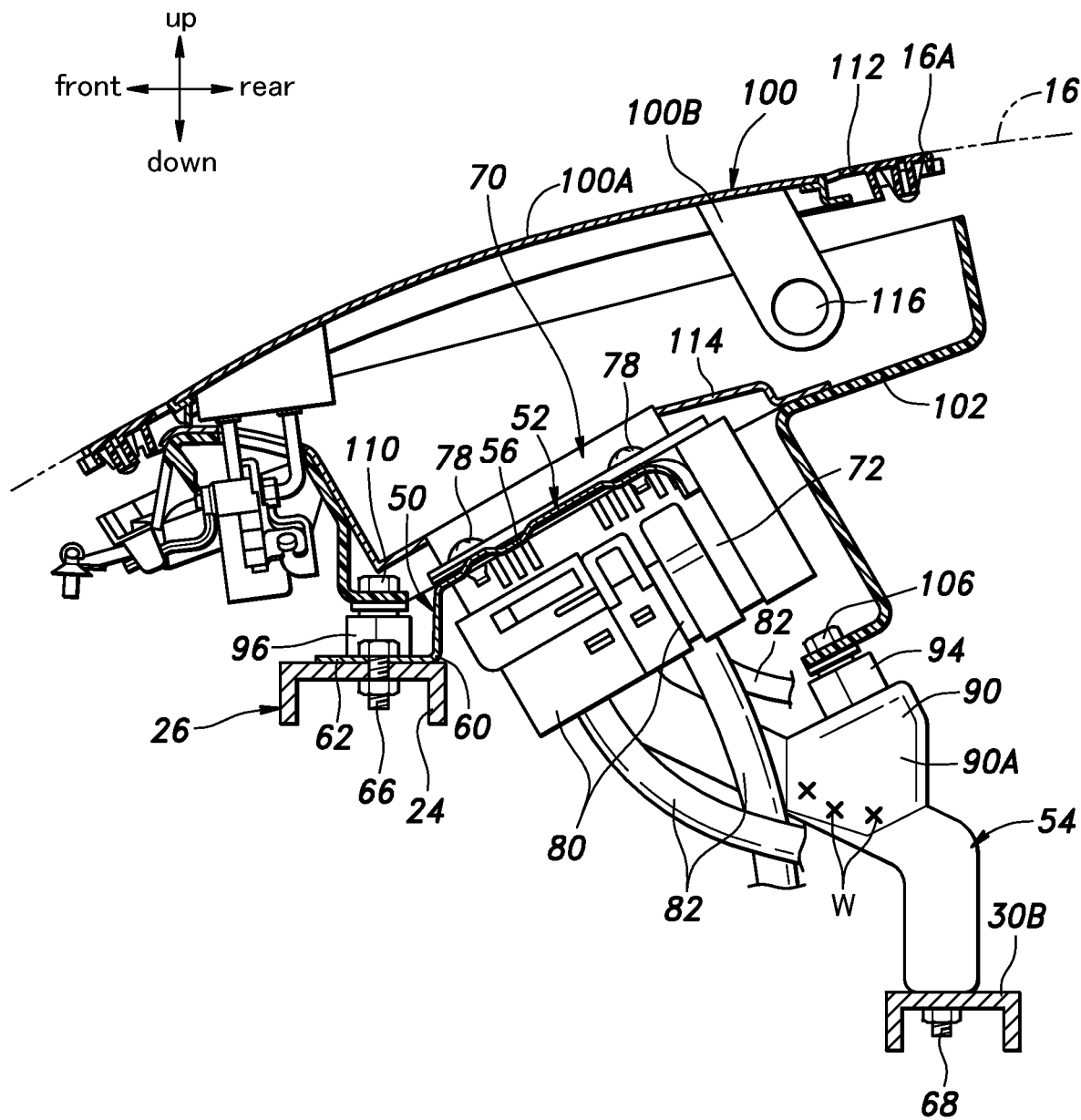
FIG. 4 is a sectional side view showing the vehicle body front structure.

As shown in FIGS. 2 to 4, the vehicle body front structure of the electric vehicle includes a pair of front side members 22 consisting of longitudinal members extending in the fore and aft direction along either side of the vehicle body, a front bulkhead 26 including an upper member 24 extending laterally and connected to the front ends of the front side members 22, and a lateral member 28 extending laterally behind the front bulkhead 26 at a certain distance therefrom.

As shown in FIG. 2, the lateral member 28 comprises a mount base 33 including a rectangular frame member 30 having three or four sides in plan view, and a pair of connecting members 32 connecting respective lateral ends of the frame member 30 to the adjoining front side members 22. In the illustrated embodiments, the frame member 30 has four sides in plan view, and includes a pair of longitudinal members 30A, a front cross member 30B connected between the front ends of the longitudinal members 30A, and a rear cross member 30C connected between the rear ends of the longitudinal members 30A.

Each connecting member 32 has an inboard end 32A which is fixed to the corresponding longitudinal member 30A of the frame member 30 via an attachment piece 30D fixed to the longitudinal member 30A, and an outboard end 32B which is fixed to the corresponding front side member 22. The inboard end 32A is fixed to the longitudinal member 30A by a threaded bolt 34, and the outboard end 32B is fixed to the front side member 22 by a pair of threaded bolts 36.

An electric box 38 containing an electric unit (not shown in the drawings) associated with the charging port device 70 is received in a central space defined by the mount base 33, and is attached to the mount base 33 by a plurality of threaded bolts 40.

Thereby, even when the electric box 38 is heavy in weight, the mount base 33 can support the electric box 38 in a stable manner, and can protect the electric unit from vibrations that could affect the NV characteristics of the electric unit. Also, the electric unit is protected from external impact from any direction by the frame member 30.

Figure 5:
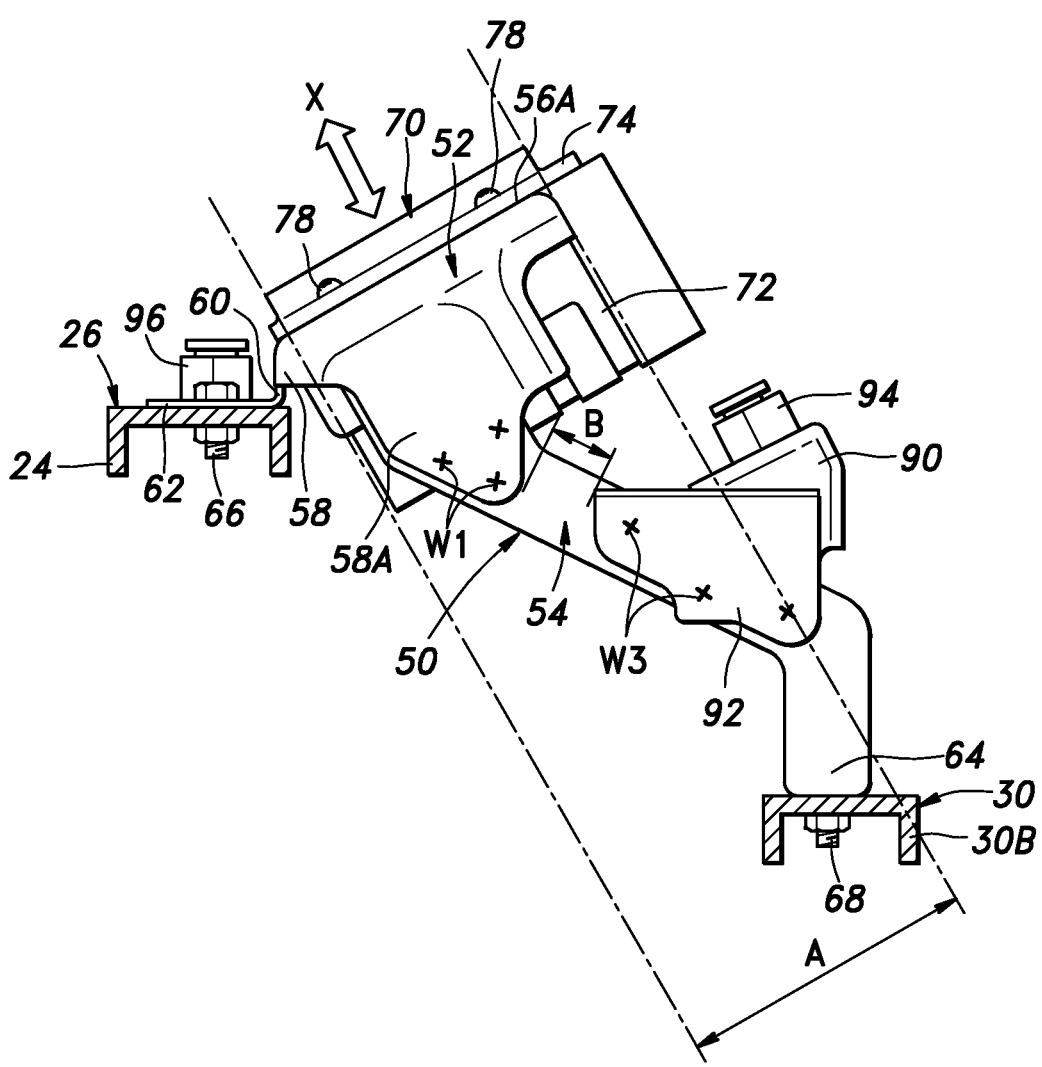
FIG. 5 is a sectional side view showing a mounting structure of a charging port device of the vehicle body front structure.

The upper member 24 and the front cross member 30B extend in parallel to each other in the lateral direction. The front cross member 30B is located at a lower position than the upper member 24 as shown in FIGS. 4 and 5.

Figure 6:
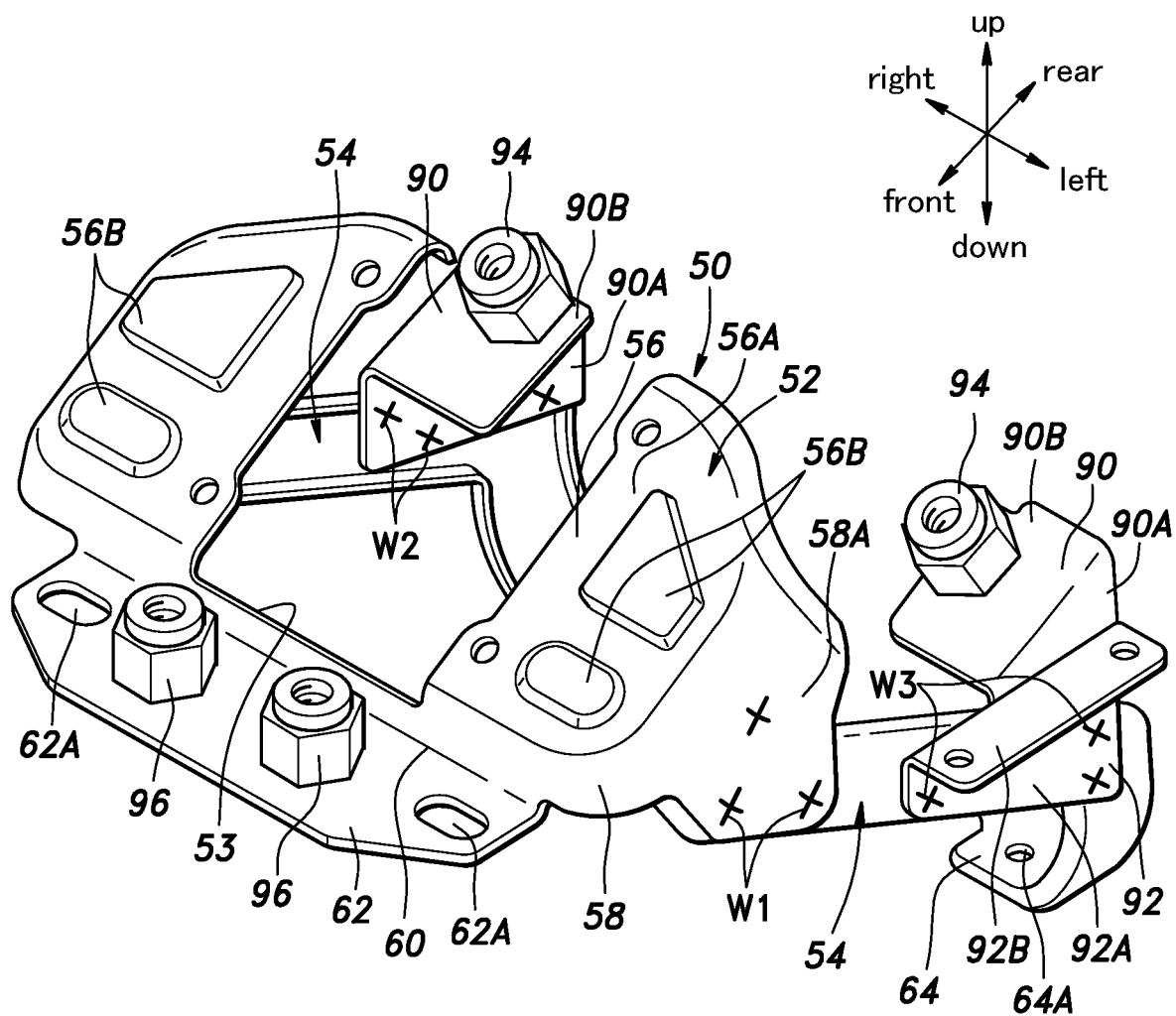
FIG. 6 is a perspective view of a support member forming a part of the mounting structure of the charging port device.
Figure 7:
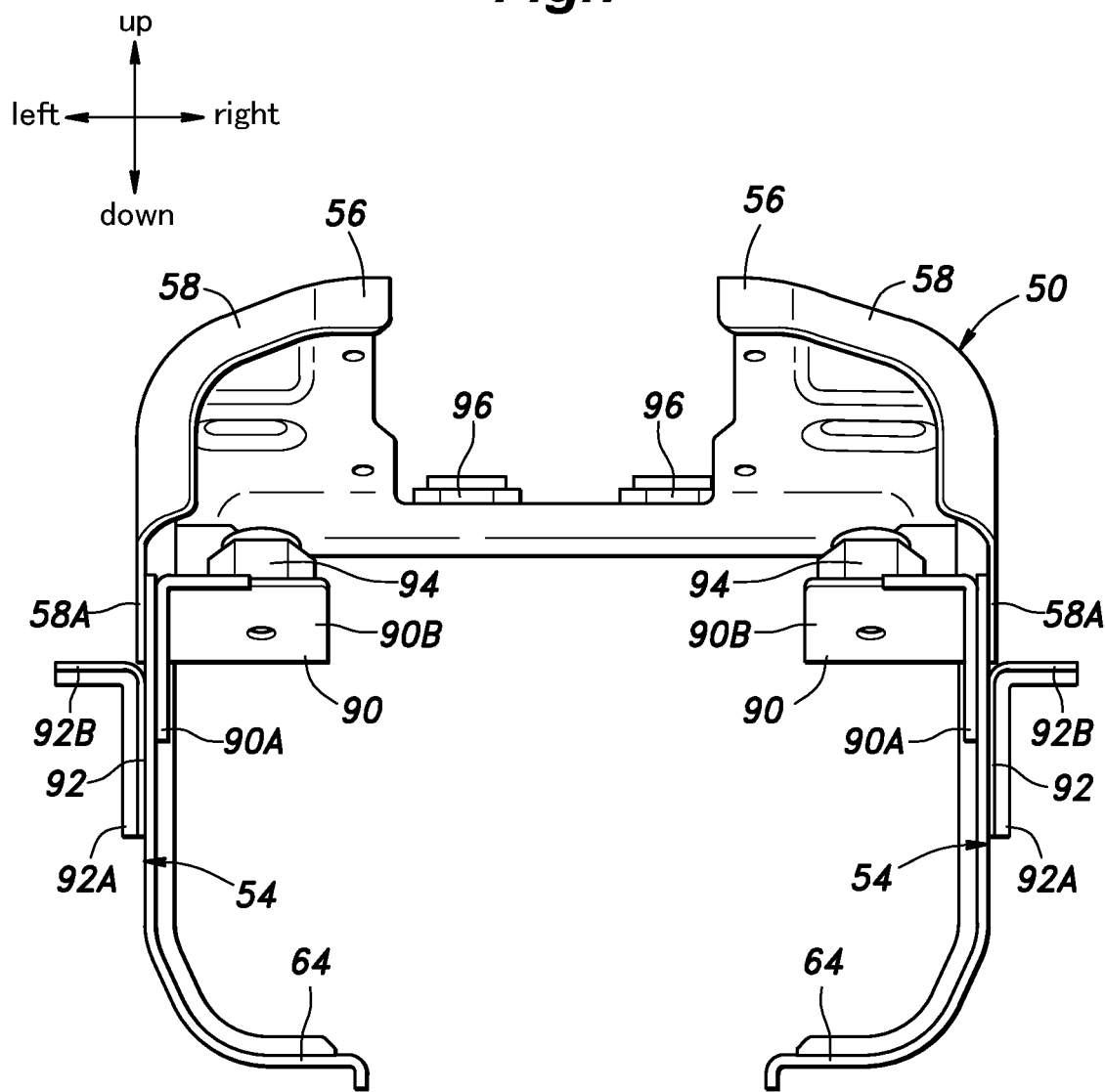
FIG. 7 is a rear view of the support member.

As shown in FIGS. 2 to 5, a support member 50 for supporting the charging port device 70 extends between the upper member 24 and the front cross member 30B, and is attached to the upper member 24 and the front cross member 30B. The support member 50 includes a main part 52 and a pair of leg pieces 54 which are made of stamp formed steel plate as best shown in FIGS. 6 and 7.

The main part 52 includes a mounting plate 56 which inclines downward toward the front, a pair of bent pieces 58 bent downward from either lateral edge of the mounting plate 56, and a front mounting piece 62 extending horizontally from a front edge of the mounting plate 56 defining a linear bend 60 extending laterally at the boundary between the mounting plate 56 and the front mounting piece 62. In this embodiment, the front end of the mounting plate 56 is provided with a vertical wall depending from the front edge of the mounting plate 56, and the front mounting piece 62 extends from the lower edge of the vertical wall. The upper surface of the mounting plate 56 defines a generally planar mounting surface 56A, and is provided with flat elevated regions 56B (FIG. 6) formed by embossing. The elevated regions 56B increase the stiffness of the mounting plate 56.

The mounting plate 56 is provided with an opening 53 which in this case consists of a cutout made from the rear edge of the mounting plate 56, and extends to a part slightly short of the linear bend 60. Thus, the mounting plate 56 is separated into two parts that are separated by the opening 53. The opening 53 receives the main part 72 of the charging port device 70.

The bent pieces 58 are each provided with a free end part 58A of a triangular shape. The tip end of the free end part 58A corresponds to a vertex of the triangular shape. The free end part 58A of each bent piece 58 overlaps with an upper end part of the corresponding leg piece 54, and is spot welded thereto at a plurality weld points W1. Each leg piece 54 is provided with a main part that extends obliquely downward and rearward, and a rear end part (lower end part) that extends vertically. The rear end of each leg piece 54 is bent in the inboard direction so as to form a rear mounting piece 64. Each leg piece 54 consists of a strip of plate member having a major plane facing laterally except for the rear mounting piece 64 which has a major plane facing vertically.

As shown in FIGS. 2 to 5, a front part of the support member 50 is fixed to the upper member 24 of the front bulkhead 26 by a pair of threaded bolts 66 passed through holes 62A (see FIG. 6) formed in the front mounting piece 62, and a rear part of the support member 50 is fixed to the front cross member 30B of the frame member 30 forming a part of the lateral member 28 by a pair of threaded bolts 68 passed through holes 64A (see FIG. 6) formed in the rear mounting pieces 64. Since the mount base 33 has a high bending rigidity, the support member 50 can be mounted to the mount base 33 in a highly secure and stable manner.

The fixing points of the support member 50 to the front cross member 30B by the bolts 68 are located in a region (A) overlapping with a projection plane of the mounting surface projected in a direction (X) for connecting and disconnecting the charging connector to and from the charging port device 70 as shown in FIG. 5.

The charging port device 70 is provided with a box-shaped main part 72, and a mounting flange 74 extending from the outer periphery of main part 72. A plurality of internal cables 82 are connected to the lower side (rear side) of the main part 72 via connectors 80, and a charging port module 76 is provided on the upper side (front side) of the main part 72. The charging port module 76 includes a pair of charging (feeding) ports 76 for 100V and 200V power supplies. The elevated regions 56B aid the positioning of the mounting flange 74 on the mounting plate 56.

The mounting flange 74 is fixed onto the mounting surface 56A of the mounting plate 56 by four screws 78, and the part of the main part 72 projecting downward from the mounting flange 74 is received in the opening 53. As a result, the main part 72 is positioned below the mounting surface 56A, and the internal cables 82 are connected to the part of the main part 72 located below the mounting surface 56A. Therefore, the internal cables 82 are allowed to extend downward from the main part 72 without interfering with other members. Thereby, the internal cables 82 can be managed with ease during the assembly process.

A first attachment piece 90 and a second attachment piece 92 each consisting of a stamp formed sheet steel are attached to a lower end part of each leg piece 54, in particular to a junction between the main part and the rear end part of the leg piece 54. The first attachment piece 90 includes a vertical piece 90A spot welded to the leg piece 54 at a plurality of weld points W2, and a lateral piece 90B extending substantially in parallel with the mounting plate 56, and provided with a welded nut 94. The second attachment piece 92 includes a vertical piece 92A spot welded to the leg piece 54 at a plurality of weld points W3, and a lateral piece 92B extending substantially horizontally, and provided with a pair of holes. The front mounting piece 62 is provided with a pair of welded nuts 96. In the front mounting piece 62, the through holes 62A are positioned on either lateral end of the front mounting piece 62, and the welded nuts 96 are positioned between the through holes 62A such that the through holes 62A and the welded nuts 96 are arranged in a single linear row extending in the lateral direction.

A lower part of the lid support member 102 is formed with a pair of through holes aligned with the welded nuts 94, and threaded bolts 106 are passed through the respective through holes, and threaded into the respective welded nuts 94 so that the leg pieces 54 are fixedly secured to the lid support member 102 via the first attachment pieces 90.

In other words, the lid support member 102 is fixed to the leg pieces 54 via the nuts 94 and the threaded bolts 106, and to the upper member 24 of the front bulkhead 26 via the nuts 96 and the threaded bolts 66, and serves as a housing for the charging port device 70 covering the periphery of the charging port device 70 and having an open top side. The lid support member 102 includes a cover plate 114 that covers the main part 52 of the support member 50 and the mounting flange 74 of the charging port device 70 while exposing the charging port module 76 to the front.

The front hood panel 16 is provided with a frame-shaped garnish 112 extending along the edge of the charging port opening 16A.

The lid member 100 is provided with a rectangular main part 100A hinged to the lid support member 102 so as to selectively close the rectangular opening defined by the frame-shaped garnish 112, and a pair of leg pieces 100B extending downward on either side of the main part 100A. The free ends of the leg pieces 100B are hinged to the lid support member 102 via laterally extending hinge shafts 116.

The lid member 100 can thus be pivoted about the hinge shafts 116 between the closed position where the main part 100A closes the rectangular opening defined by the frame-shaped garnish 112, and the open position where the rectangular opening defined by the frame-shaped garnish 112 is opened up by pivoting itself from the closed position by about 90 degrees as shown in FIG. 1.

According to the vehicle body front structure of the illustrated embodiment, the support member 50 supporting the charging port device 70 is disposed between the upper member 24 of the front bulkhead 26 and the lateral member 28 located behind the upper member 24. As opposed to the case where the support member 50 projects forward from the upper member 24 as a cantilever, the front overhang can be reduced. In particular, the charging port device 70 can be accommodated without increasing the front overhang. Thereby, the electric vehicle can be designed with a high level of freedom, and can be made amenable to a highly compact design.

Since the charging port device 70 is located rearward of the front bulkhead 26, an impact load of a frontal collision is less likely to be transmitted to the charging port device 70 as compared with the case where the support member 50 projects forward past the upper member 24 so that the charging port device 70 is favorably protected from the impact of a frontal collision.

The fixing points of the support member 50 to the front cross member 30B by the bolts 68 are located in a region (A) overlapping with a projection plane of the mounting surface projected in a direction (X) for connecting and disconnecting the charging connector to and from the charging port device 70 so that the force applied to the charging port device 70 when connecting and disconnecting the charging connector to and from the charging port device 70 is prevented from generating any substantial bending moment in the support member 50, and the mounting strength of the support member 50 can be increased.

Since the support member 50 is provided with the bent pieces 58 along the outer peripheral edge of the mounting surface 56A, the bending stiffness of the mounting plate 56 is improved, and the mounting strength of the charging port device 70 to the mounting plate 56 is improved.

Since the mount base 33 is connected to the front side members 22, and additionally to the front bulkhead 26 via the support member 50, the support member 50 is firmly supported against rotation around a lateral axis. Therefore, even though a heavy object such as the electric box 38 is mounted on the mount base 33, the mount base 33 is able to support the heavy object in a highly stable manner. Therefore, the NV performance of the electric box 38 can be improved. The support member 50 performs the dual functions of firmly supporting the charging port device 70 and reinforcing the mount base 33 against external forces. Furthermore, the mount base 33 allows the electric box 38 containing components associated with the charging port device 70 to be positioned adjacent to the charging port device 70 so that the electric connection between the charging port device 70 and the electric box 38 can be facilitated, and owing to the reduced length of the cables between the charging port device 70 and the electric box 38, power loss can be minimized.

As shown in FIG. 5, the leg pieces 54 of the support member 50 are reinforced by the bent pieces 58 overlapped onto and spot welded (at the weld points W1) to the upper ends of the leg pieces 54. Similarly, the lower ends of the main parts of the leg pieces 54 are reinforced by the attachment pieces 90, 92 overlapped onto and spot welded (at the weld points W1 and W2) to the lower parts of the main parts of the leg pieces 54. On the other hand, intermediate parts of the main parts of the leg pieces 54 (indicated by letter B in FIG. 5) are not reinforced, and are given with a relatively low bending stiffness.

Thus, when an excessive impact load is applied to the support member 50 via the front bulkhead 26 at the time of a frontal collision, for instance, the intermediate parts of the main parts of the leg pieces 54 which are not reinforce serve as frangible parts B that preferentially deform or otherwise yield to the load applied thereto so that the charging port device 70 is protected from damages.

The front mounting piece 62 by which the support member 50 is attached to the upper member 24 extends forward from the front edge of the mounting plate 56. More specifically, a vertical wall depends from the front edge of the mounting plate 56, and the lower end of the vertical wall is bent forward along the bend 60 so as to continue to the front mounting piece 62. Therefore, when a downward load is applied to the support member 50, the mounting plate 56 deflects downward relative to the front mounting piece 62 by bending along the bend 60 so that the energy of the load can be favorably absorbed.

When an excessive load is applied to the lid member 100 from above, the lateral piece 90B of each first attachment piece 90 bends downward about the bend between the vertical piece 90A and the lateral piece 90B. Thereby, the energy of the downward impact load can be absorbed.

Figure 8:
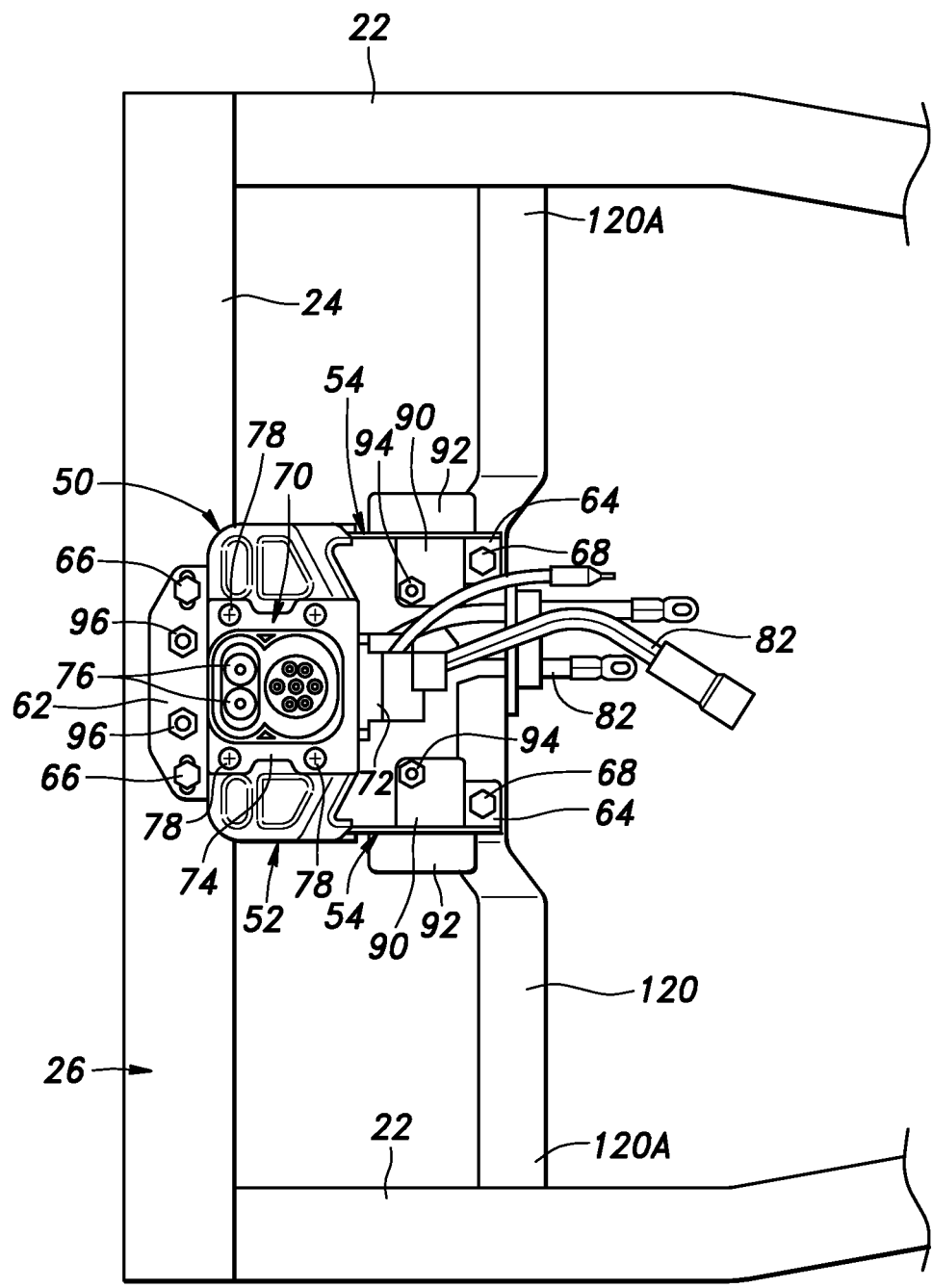
FIG. 8 is a plan view of a vehicle body front structure according to another embodiment of the present invention.

FIG. 8 shows another embodiment of the vehicle body front structure according to the present invention. In FIG. 8, the parts corresponding to those of the previous embodiment shown in FIG. 2 are denoted with like numerals without necessarily repeating the description such parts.

In this embodiment, a lateral member 120 made of a channel member or the like is provided behind the front bulkhead 26 at a certain distance. The two lateral ends 120A of the lateral member 120 are attached to the respective front side members 22. A rear end part of the support member 50 is fixed to the lateral member 120 by threaded bolts 68.

This embodiment is otherwise similar to the previous embodiment. This embodiment provides advantages similar to those of the previous embodiment except for those attributed to the presence of the mount base 33.

The present invention was described above in terms of specific embodiments, but is not limited by such embodiments, and can be modified in various ways without departing from the spirit of the present invention. For example, the frame member 30 of the first embodiment may have a U-shape in plan view with the rear cross member 30C omitted. The frangible part B of the support member 50 may be formed by a bend, a bellows structure, a reduced plate thickness, an opening, or the like, in addition to the single plate structure of the foregoing embodiment. The vehicle body front structure according to the present invention is not limited to electric vehicles, but may be applied to hybrid vehicles. Moreover, all the components shown in the above embodiment are not necessarily essential, and it is possible to select them as appropriate without departing from the spirit of the present invention.

The invention claimed is:

1. A vehicle body front structure provided with a charging port device to which a charging connector is selectively connected, the vehicle body front structure comprising:
   a pair of longitudinal members extending in a fore and aft direction on either side of a vehicle body;
   a bulkhead including an upper member extending laterally and having lateral ends connected to the respective longitudinal members;
   a lateral member extending laterally behind the bulkhead, and having lateral ends connected to the respective longitudinal members; and
   a support member having a front part fixed to the upper member and a rear part fixed to the lateral member to support the charging port device.

2. The vehicle body front structure according to claim 1, wherein the support member has a flat mounting plate to which the charging port device is attached, the support member being fixed to the lateral member at a fixing point which is located in a region overlapping with a projection plane of a mounting surface of the mounting plate projected in a direction for connecting and disconnecting the charging connector to and from the charging port device.

3. The vehicle body front structure according to claim 2, wherein the support member includes a bent piece provided on a peripheral edge of the mounting plate.

4. The vehicle body front structure according to claim 2, wherein the support member includes a front mounting piece extending forward from the mounting plate, the front mounting piece defining a laterally extending bend at a boundary between the mounting plate and the front mounting piece, the front mounting piece being fixed to the upper member at a fixing point.

5. The vehicle body front structure according to claim 2, wherein the charging port device includes a main body connected to an internal cable, and the support member is provided with an opening receiving the main body therein.

6. The vehicle body front structure according to claim 1, wherein the support member includes a frangible part which is reduced in mechanical strength relative to a surrounding part.

7. The vehicle body front structure according to claim 1, wherein the lateral member comprises a mount base including a rectangular frame member having three or four sides in plan view, and a pair of connecting members connecting respective lateral ends of the frame member to the adjoining longitudinal members.

8. The vehicle body front structure according to claim 7, wherein an electric unit associated with the charging port device is attached to the mount base.

9. The vehicle body front structure according to claim 1, further comprising a lid support member attached to the support member via a pair of attachment pieces and surrounding the charging port device, and a lid member hinged to the lid support member for selectively exposing the charging port device, wherein each attachment piece includes a bend therein so as to be L-shaped in front view.

* * * * *